United States Patent
Aoki

(10) Patent No.: US 8,130,744 B2
(45) Date of Patent: Mar. 6, 2012

(54) COMMUNICATION APPARATUS AND CONTROL METHOD, PROGRAM, AND STORAGE MEDIUM THEREOF

(75) Inventor: Norihito Aoki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 692 days.

(21) Appl. No.: 12/282,855

(22) PCT Filed: Apr. 12, 2007

(86) PCT No.: PCT/JP2007/058472
§ 371 (c)(1),
(2), (4) Date: Sep. 12, 2008

(87) PCT Pub. No.: WO2007/125807
PCT Pub. Date: Nov. 8, 2007

(65) Prior Publication Data
US 2009/0129368 A1 May 21, 2009

(30) Foreign Application Priority Data
Apr. 28, 2006 (JP) .................. 2006-126927

(51) Int. Cl.
*H04J 3/06* (2006.01)
(52) U.S. Cl. .................. 370/350; 370/311; 370/347
(58) Field of Classification Search .................. 370/350, 370/311, 330, 338, 347
See application file for complete search history.

(56) References Cited

U.S. PATENT DOCUMENTS

| | | | |
|---|---|---|---|
| 6,026,303 A | 2/2000 | Minamisawa | |
| 6,804,209 B1 | 10/2004 | Sugaya et al. | |
| 2004/0255001 A1 | 12/2004 | Oh et al. | |
| 2005/0185628 A1* | 8/2005 | Watanabe et al. | 370/347 |
| 2006/0251017 A1* | 11/2006 | Bishop | 370/330 |
| 2007/0053315 A1 | 3/2007 | Sugaya | |
| 2007/0086401 A1* | 4/2007 | Hong et al. | 370/338 |
| 2009/0040954 A1* | 2/2009 | Usuba | 370/311 |
| 2009/0097464 A1* | 4/2009 | Sakoda | 370/338 |

FOREIGN PATENT DOCUMENTS

| | | |
|---|---|---|
| JP | 2003-174456 A | 6/2003 |
| JP | 2003-348104 A | 12/2003 |
| JP | 2005-253038 A | 9/2005 |

OTHER PUBLICATIONS

PCT International Search Report and Written Opinion of the International Searching Authority, Mailing Date Jul. 10, 2007.
Official Action dated Jan. 6, 2010 in Japanese Application No. 2006-126927.

* cited by examiner

*Primary Examiner* — Albert T Chou
(74) *Attorney, Agent, or Firm* — Fitzpatrick, Cella, Harper & Scinto

(57) ABSTRACT

A communication apparatus comprises: a determination unit to determine whether there exists an external apparatus that has not undergone synchronization adjustment; and a control unit to exert control, if the external apparatus exists, so that the communication apparatus functions as an apparatus which sends beacon information to adjust the synchronization timing of communication, and so that, if the external apparatus does not exist, the communication apparatus functions as an apparatus which does not send beacon information to adjust the synchronization timing of communication.

9 Claims, 14 Drawing Sheets

COMMUNICATION APPARATUS AND CONTROL METHOD, PROGRAM, AND STORAGE MEDIUM THEREOF

TECHNICAL FIELD

The present invention relates to a communication apparatus and control method, program, and storage medium thereof, particularly to technologies for performing communication while maintaining low power consumption.

BACKGROUND ART

There is known a communication standard called WUSB (Wireless Universal Serial Bus) in which communication is performed by the time division multiple access (TDMA) method (wireless USB specifications 1.0).

In the wireless communication system of the WUSB standard, the host and device form a WUSB cluster, and communication is performed by using a superframe of the time division multiple access base. A single superframe is structured by 256 media access slots (MASs) of 256 μs each, where for the first 16 MASs, only beacons are sent as part of beacon period (BP). The remaining period is reserved in each cluster as distributed reservation periods (DRPs, 500, 510, 520, 530, 540, 550, 551, 560, 561), which are communication bands. The period of a DRP is indicated by a DRP information element (DRP IE) inside a beacon sent from a host or a device.

The synchronization management of a host and a device is performed in an autonomous distributed manner, and the host has the function of performing synchronization management of a superframe. The host and device perform synchronization adjustment of the superframe in response to receiving a beacon from an external apparatus. However, there may be devices which exist as part of the wireless communication system of the WUSB standard but which do not perform superframe synchronization adjustment. Devices are divided broadly, as described below, according to the superframe synchronization adjustment management function.

A self-beaconing device (SBD) which itself performs superframe synchronization adjustment management.

A directed beaconing device (DBD) which itself does not perform superframe synchronization adjustment management.

A non beaconing device (NBD) which does not itself perform synchronization management, and, in order to reduce power consumption, does not perform sending and receiving of beacons.

A plurality of WUSB clusters can exist in a wireless communication system of the WUSB standard. It is permissible for these clusters to overlap (i.e., apparatuses such as hosts and devices may form a plurality of clusters). To enable time division multiple access in this kind of system, the hosts and devices mutually establish synchronization in a superframe (i.e., perform synchronization and DRP reservation). A detailed description of the operations involved in establishing synchronization is given below. In addition, if a cluster contains only a host and a WUSB device that operates as an SBD, the host does not require operations related to establishing superframe synchronization adjustment in a WUSB layer, as the SBD mainly controls processes related to establishing synchronization adjustment.

FIG. 2 is a diagram showing an example of a plurality of WUSB clusters having overlapping parts. In FIG. 2, reference numeral 210 is a WUSB host which functions as a host in a WUSB cluster 200. Reference numeral 220 is a WUSB device which functions as a device. In FIG. 2, there is only one WUSB device controlled by the WUSB host, but it is permissible for there to be a plurality of WUSB devices if necessary. The communication system of FIG. 2 comprises two WUSB clusters 200 and 201, which comprise WUSB hosts 210 and 211 and a WUSB device 220. In FIG. 2, a different WUSB host 211 forms the WUSB cluster 201 and the WUSB device 220 is positioned to be within the communication range of the WUSB cluster 200 and 201.

Next, the frame structure of a media access control (MAC) layer used by the WUSB standard will be described with reference to FIG. 3. FIG. 3 is a diagram schematically showing the format of a superframe of the WUSB standard.

In the WUSB standard, the communication duration is managed in a frame unit called superframe (300, 301, 302, 303). A superframe is composed of 256 MASs 350, each of which is 256 μs. Therefore, the duration of one superframe is 65,536 μs. The 16 MASs at the start of the superframe are assigned as a BP (400 to 419). By sending a beacon to within the BP 400, the WUSB host and SBD reserves the band in the superframe as a DRP. The starting point of the superframe (i.e., the starting point of the BP 400) is called a beacon period start time (BPST) 4100. A beacon 700 comprises a beacon group (BG) parameter 701, a DRP IE (702) and other information elements (IEs) 703, and notifies the position of the MAS reserved using the DRP IE 702.

During the BP, an SBD not only sends a beacon, but also receives and analyzes beacons from other devices during other beacon slots. Consequently, the SBD consumes a great amount of power during execution of superframe synchronization adjustment management.

Here, apparatuses that are going through superframe synchronization adjustment at the MAC layer level are defined as neighbors, and apparatuses that are not going through synchronization are defined as aliens.

Next, the relationship between a MAC layer and a WUSB channel of the WUSB standard will be described with reference to FIG. 4. FIG. 4 is a schematic diagram showing mapping from a WUSB channel to MAC layer channel reservation.

In FIG. 4, each DRP (420, 430, 440, 450, 460, 470) corresponds to a communication reservation period within a WUSB cluster. In each of these DRPs, a micro-scheduled management command (MMC, 421, 423, 431, 433, 441, 443, 445, 451, 453, 461, 463, 471), which controls the input-output direction, is broadcast by a WUSB host. Here, each MMC comprises a header and a plurality of IEs. The interval between an MMC and another MMC is called a transaction group (TG). For example, the TG of relevance to an MMC 443 is a TG 444.

Next, FIG. 5 will be referenced to describe the superframe synchronization adjustment performed when the WUSB host 210 forms the WUSB cluster 200 in the case where the WUSB device 220 in FIG. 2 is an SBD. FIG. 5 is a schematic diagram showing the timing chart when a WUSB device, operating as an SBD, connects to a WUSB host.

In FIG. 5, the WUSB host 210 sends, after starting up, a beacon from a beacon slot within the BP 400, and reserves a DRP 500. On the other hand, the WUSB device 220, when starting up, performs channel scanning in the superframe N (300, S330), and receives the beacon 700. In addition, the WUSB device 220 analyzes the received beacon 700, and detects a beacon slot that can be used by the WUSB device 220, beacon synchronization timing, etc.

In a superframe N+1 (301), the WUSB host 210 and the WUSB device 220 both send a beacon using a beacon slot during the period of the BP 401, and secures a DRP 510. However, the WUSB device 220 sends a beacon using a usable beacon slot detected in the superframe N (300). As with the BP 401 in FIG. 5, synchronization in the superframe period has been established at the point where a beacon is sent and received by a plurality of apparatuses in the same BP.

In a superframe N+2 (302), the type of a DRP 520 is reserved in private in order to establish a WUSB channel. The WUSB host 210 forms a TG in the DRP 520. The WUSB device 220 sends a connect request, and by the WUSB host replying with a connect acknowledgement in a MMC, a process of establishing a WUSB cluster is begun after a superframe N+3 (303).

Described as follows is the process in which superframe synchronization adjustment is further performed between the WUSB device 220 and the WUSB host 211, in the case where the WUSB device 220, which is an SBD, and the WUSB host 210 have already formed the cluster 200. FIG. 6 is a timing chart for when superframe synchronization adjustment is performed with the WUSB host 211 via the WUSB device 220, in the case where the WUSB host 210 has already formed the WUSB cluster 200 with the WUSB device 220, which is an SBD. In other words, FIG. 6 shows the process of synchronization adjustment with an external apparatus when functioning as an apparatus which sends beacon information for adjusting synchronization timing of communication.

In the superframe N (300), the WUSB host 210 and the WUSB device 220 commonly send beacons from their beacon slots in a BP 404, and reserve a DRP 540. The WUSB device 220 also further performs channel scanning of the superframe N (300). Assume a situation in which, while channel scanning, the WUSB device 220 receives a beacon sent during the BP 480 period by the WUSB host 211.

In this situation, the WUSB host 210 and the WUSB device 220 changes the timing of the superframe so that synchronization with the beacon delivery timing of WUSB host 211 is achieved. That is, when a beacon is received from the WUSB host 211, the WUSB device 220 notifies, via a beacon in a BP 405, the starting point of the BPST to the WUSB host 210. The change in the starting point of the BPST is indicated by a BP switch IE in the beacon. Also, a DRP 550 is reserved as a DRP used by an alien. After a pre-determined period, the BPST of all devices in the WUSB cluster 200 is moved in the superframe N+2 (302), and are made to be the same period as the BP of the WUSB host 211. Through this process, superframe synchronization adjustment is established.

As described with reference to FIG. 5 and FIG. 6, a WUSB device operating as an SBD can dynamically form a cluster with a host or other device, in order to perform superframe synchronization adjustment. However, in practice, a beacon is sent and received even in the situation in which superframe synchronization adjustment is not needed. Consequently, in the case where a mobile device, driven by a battery for apparatuses such as digital cameras and PDAs, is operated as a WUSB device that operates as an SBD, electrical power stored in the battery is used rapidly and the duration of use is shortened.

On the other hand, a WUSB device which operates as an NBD has low power consumption as it does not perform sending and receiving of beacons. However, because it cannot synchronize during a superframe, in the case where there exist alien wireless communication apparatuses, a device operating as an NBD is subject to interference from the wireless communication signal emitted by those apparatuses, and throughput is decreased.

DISCLOSURE OF INVENTION

The present invention was made in view of the above problems, and provides a technology for performing synchronization adjustment with an external apparatus only when necessary, hence achieving synchronization adjustment while maintaining low power consumption.

In order to achieve the above object, the communication apparatus of the present invention has the configuration below. That is, the communication apparatus comprises:

a determination unit to determine whether there exists an external apparatus that has not undergone synchronization adjustment; and a control unit to exert control, if the external apparatus exists, so that the communication apparatus functions as an apparatus which sends beacon information to adjust the synchronization timing of communication, and so that, if the external apparatus does not exist, the communication apparatus functions as an apparatus which does not send beacon information to adjust the synchronization timing of communication.

In addition, other communication apparatuses of the present invention have the configuration below. That is, the communication apparatus comprises:

a determination unit which determines the existence of another communication apparatus which has not undergone frame synchronization adjustment;

a switching unit which switches the communication apparatus to function as an apparatus which performs frame synchronization adjustment with the other communication apparatus if the other communication apparatus exists, and switches the communication apparatus to function as an apparatus which does not perform frame synchronization adjustment with the other communication apparatus if the other communication apparatus does not exist.

Moreover, the control method of the communication apparatus of the present invention has the configuration below. That is, the control method of the communication apparatus comprises:

a determination step of determining whether there exists an external apparatus that has not undergone synchronization adjustment; and a control step of, if the external apparatus exists, making the communication apparatus function as an apparatus which sends beacon information for adjusting the synchronization timing of communication, and, if the external apparatus does not exist, making the communication apparatus function as an apparatus which does not send the beacon information.

Also, the control method of other communication apparatuses of the present invention has the configuration below. That is, the control method of the communication apparatuses comprise:

a determination step of determining the existence of another communication apparatus which has not undergone frame synchronization adjustment; and a switching step of switching the communication apparatus to function as an apparatus which performs frame synchronization adjustment with the other communication apparatus if the other communication apparatus exists, and switching the communication apparatus to function as an apparatus which does not perform frame synchronization adjustment with the other communication apparatus if the other communication apparatus does not exist.

Further features of the present invention will become apparent from the following description of exemplary embodiments (with reference to the attached drawings).

BEST MODE FOR CARRYING OUT THE INVENTION

Exemplary embodiments of the present invention will be described with reference to the attached drawings below. However, the constituent elements referred to in these embodiments are merely exemplary, and do not restrict the scope of the present invention to only these embodiments.

First Embodiment

The configuration of the present embodiment will be described according to WUSB standards. Configurations of a communication apparatus and a communication system of the present embodiment will be described with reference to FIG. 1 and FIG. 2. The communication apparatus may be a single apparatus or a plurality of apparatuses depending on need.

(System Configuration)

Figure 2:
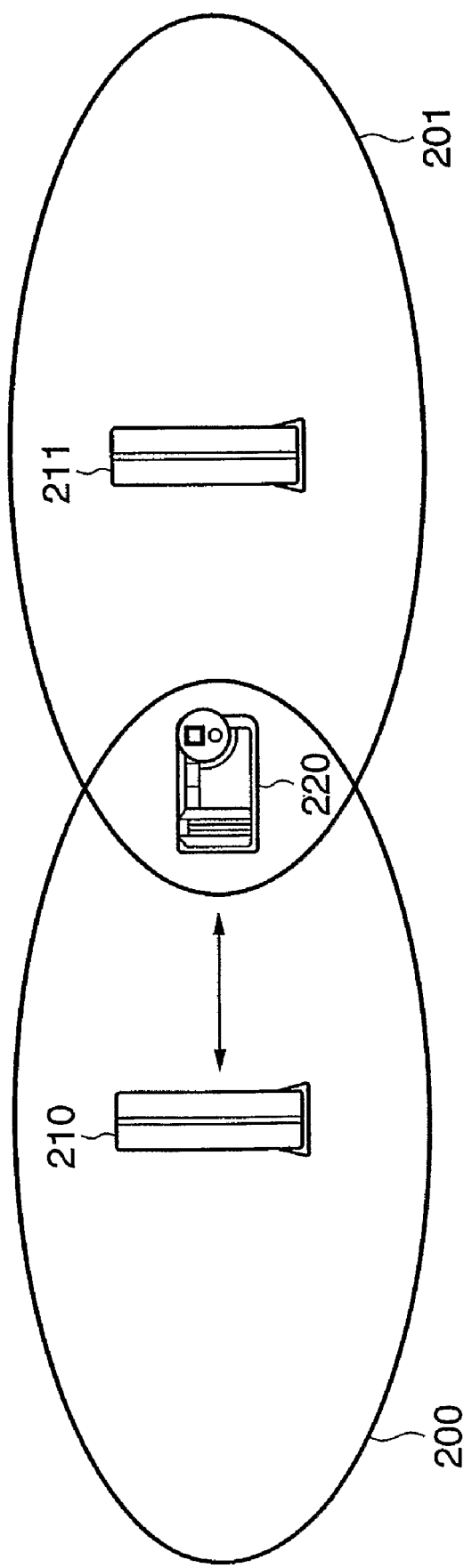
FIG. 2 is a diagram showing an example of a plurality of WUSB clusters having overlapping parts.
Figure 3:
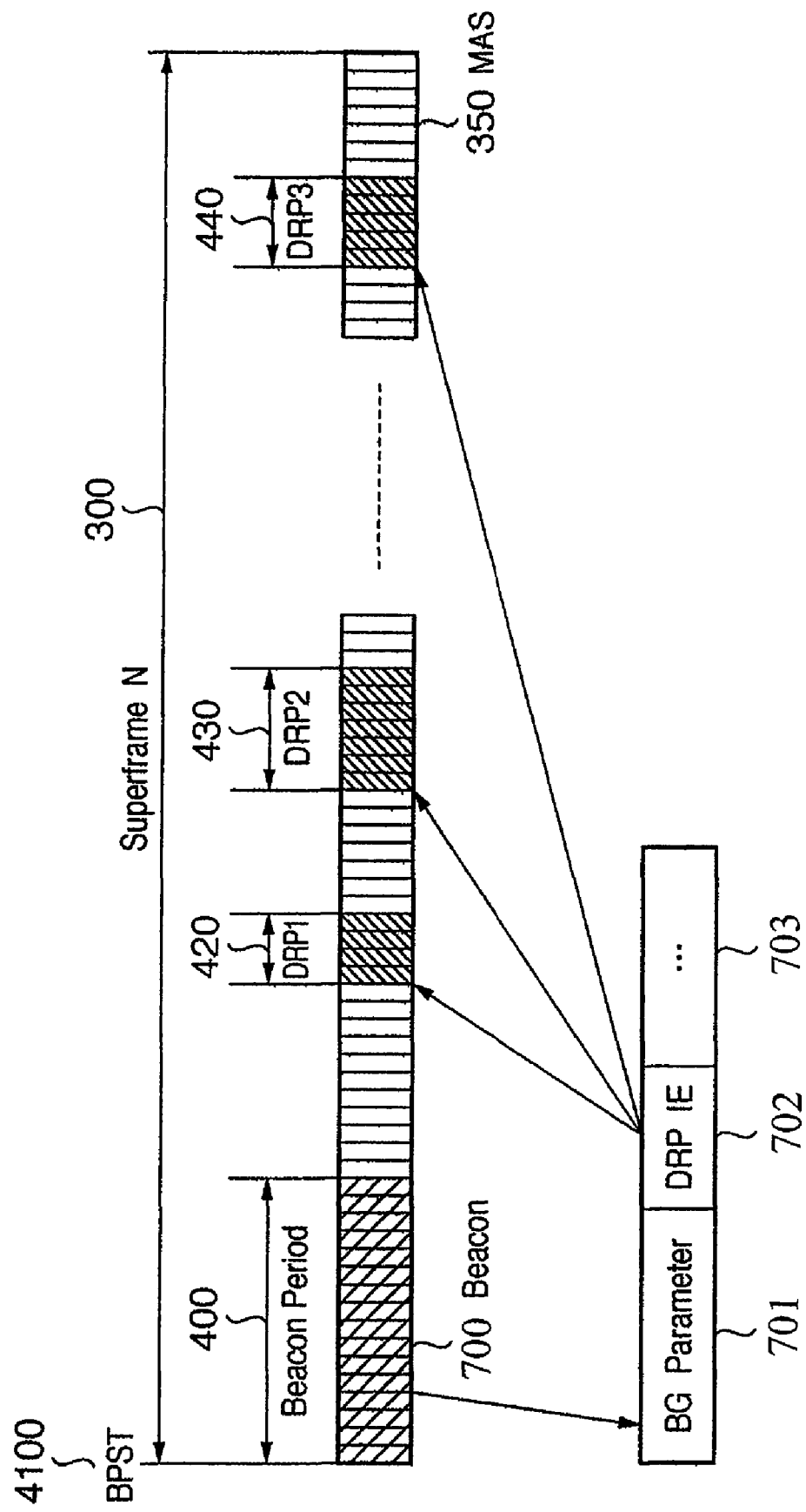
FIG. 3 is a diagram schematically showing the format of a superframe of the WUSB standard.
Figure 4:
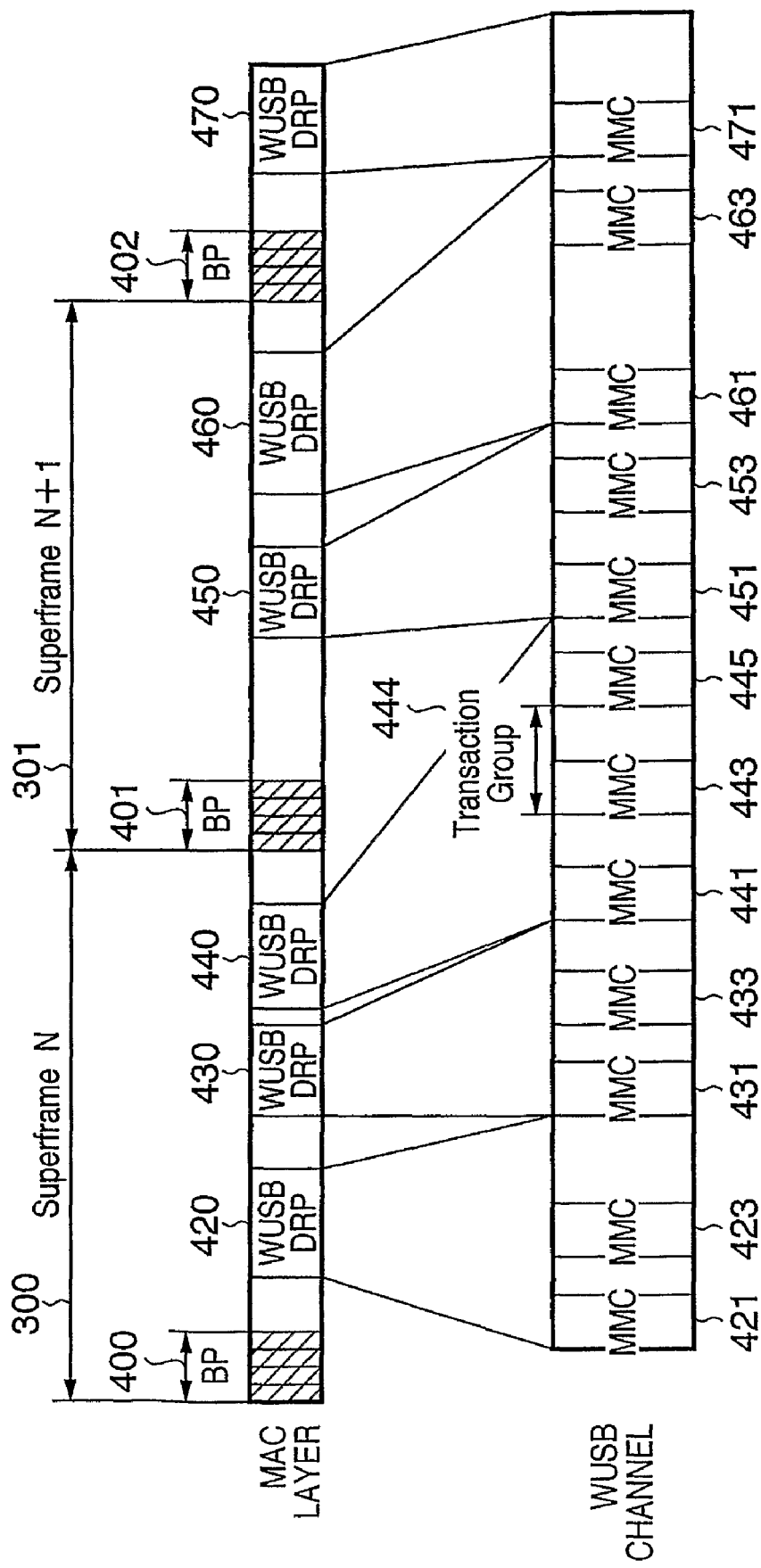
FIG. 4 is a diagram schematically showing the mapping from a WUSB channel to MAC layer channel reservation.
Figure 5:
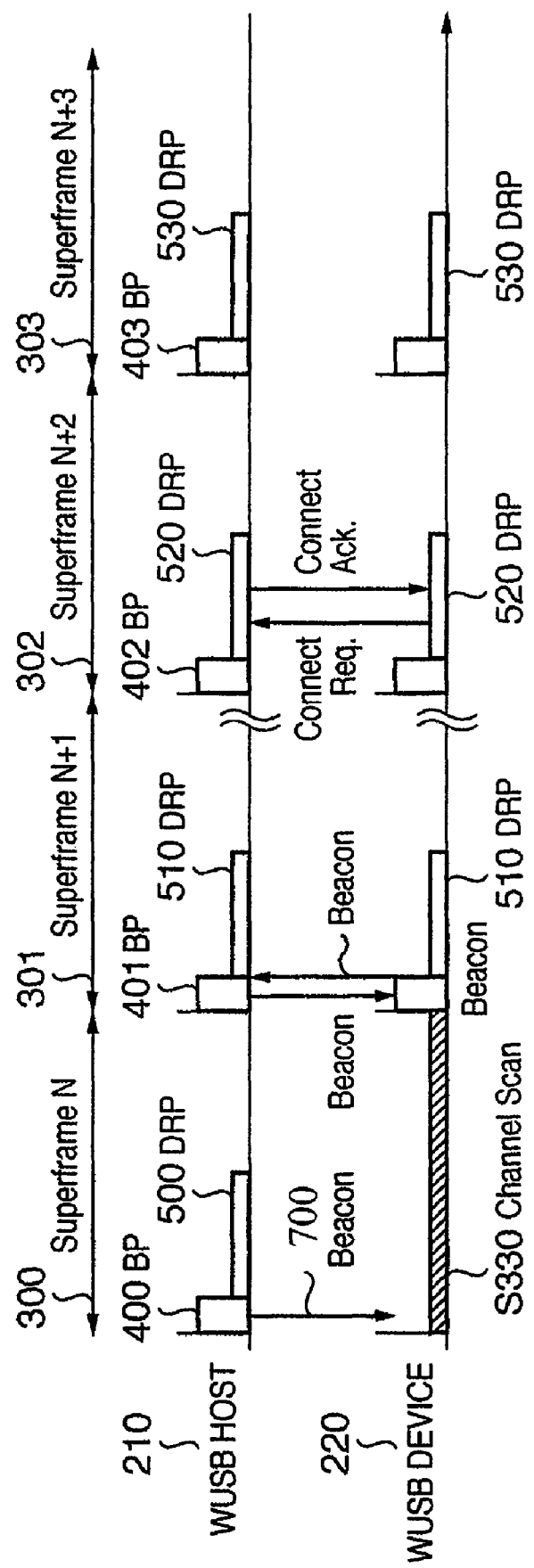
FIG. 5 is a diagram schematically showing a timing chart of when a WUSB device, operating as an SBD, connects to a WUSB host.

The communication system of the present embodiment is schematically shown, as in FIG. 2. That is, the host 210 and the device (communication apparatus) 220 are positioned at a distance at which wireless communication is possible, and the device 220 and the host 211 are also similarly positioned at a distance at which wireless communication is possible. However, these configurations are examples shown in a convenient manner in order to facilitate description, and possible configurations are not limited to these. For example, for communication between the host 210 and the device 220 to occur, the host 211 is unnecessary.

Figure 1:
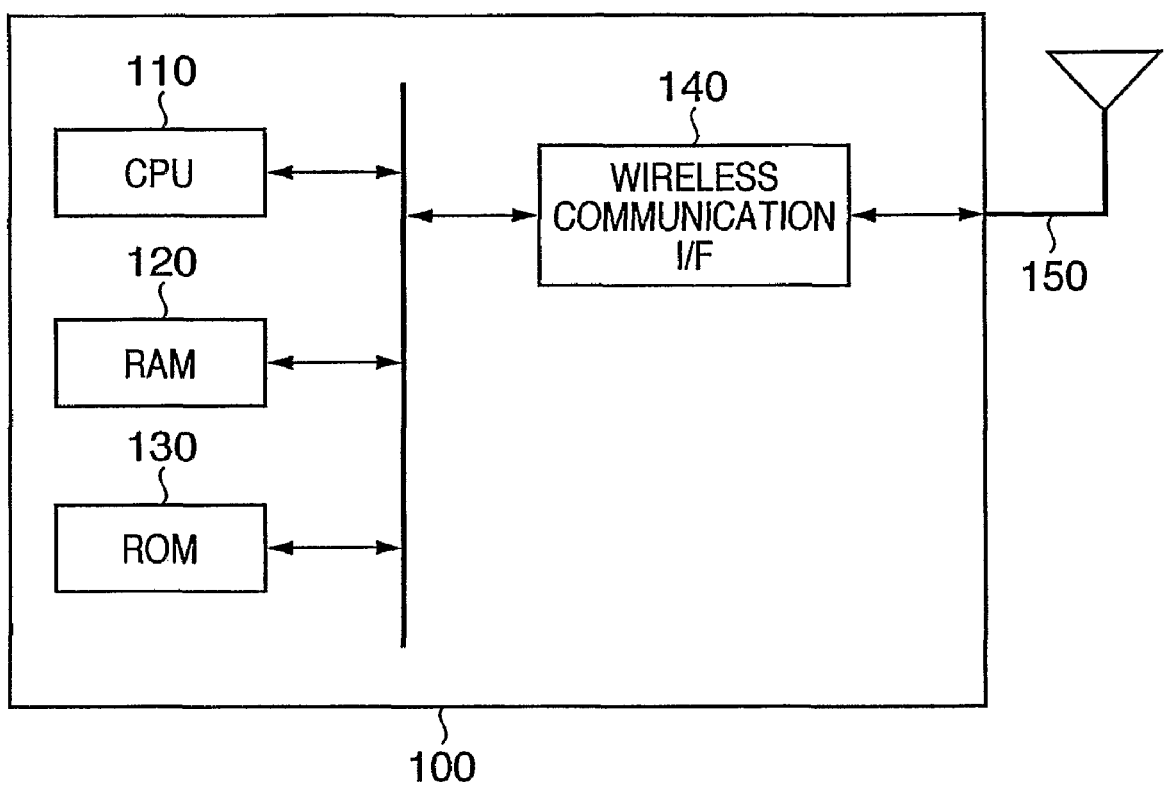
FIG. 1 is a block diagram schematically showing the hardware configuration of a communication apparatus.

Next, the configuration of the communication apparatus of the present embodiment will be described with reference to FIG. 1. FIG. 1 is a block diagram schematically showing the hardware configuration of a communication apparatus 100 of the present embodiment. Reference numeral 110 in FIG. 1 is a central processing unit (CPU) which serves as a control unit controlling the entire communication apparatus 100. Reference numeral 120 is a random access memory (RAM) which temporarily stores programs and data supplied from an external apparatus. Reference numeral 130 is a read only memory (ROM) which stores programs and parameters which do not require changing. Reference numeral 140 is a wireless communication interface realizing wireless communication functions. Reference numeral 150 is an antenna used by the wireless communication interface 140. The wireless communication apparatus 100 may be implemented in the above configuration or may be implemented by adding additional functions such as a storage apparatus or a display apparatus, depending on need.

In addition, hardware apparatuses can be substituted by using software that implements functions identical to those of each of the above apparatuses.

In the present embodiment, there is indicated an example in which programs and data related to the present embodiment are loaded into the RAM 120 from the ROM 130, but other examples are possible. For example, loading into the RAM 120 may be performed from a hard disk apparatus, memory apparatus, etc., in which programs have already been installed. Alternatively, it is possible to store programs of the present embodiment in the ROM 130 and configure these stored programs to make up a part of a memory map, and directly execute them using the CPU 110.

In addition, the present embodiment describes, for the sake of convenience, a configuration in which the communication apparatus 100 according to the present embodiment may be realized with a single apparatus, but a configuration in which resources are distributed to a plurality of apparatuses is also possible. For example, a configuration in which storage and computation resources are distributed to a plurality of apparatuses is also possible. Alternatively, resources may be distributed for each constituent feature implemented hypothetically on the communication apparatus, and parallel processing may be performed.

(Switching from SBD to NBD Operation)

Figure 7:
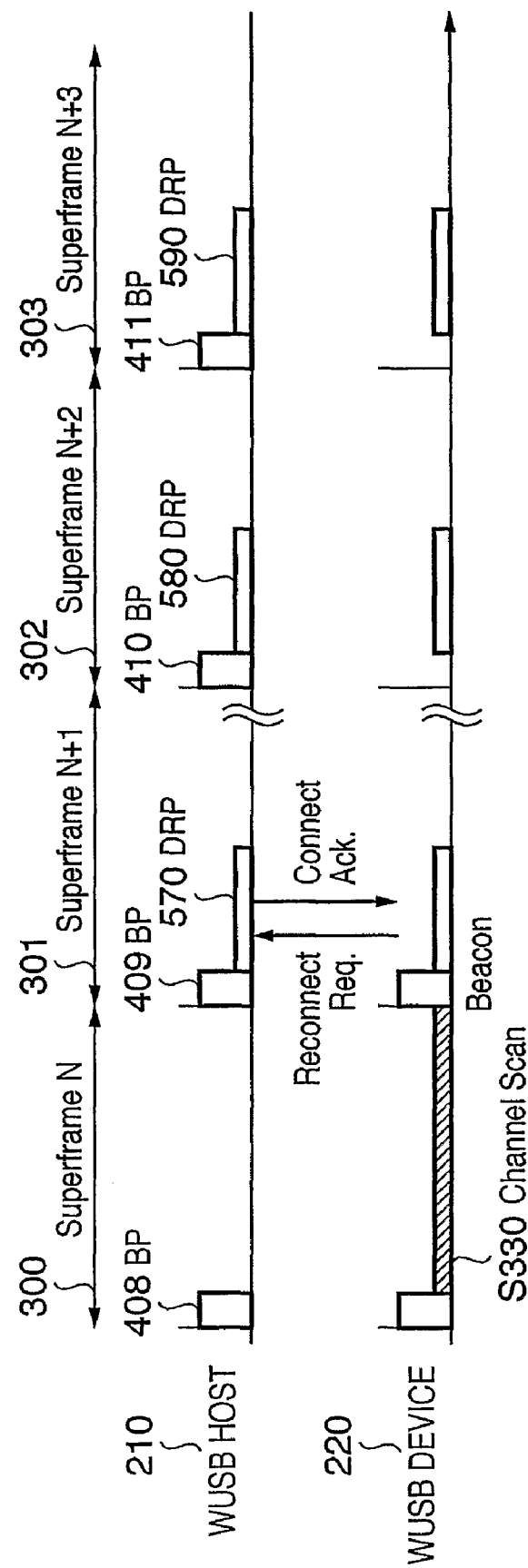
FIG. 7 is a timing chart of when there is a switching of operation from SBD to NBD.

Next, the process in which the device 220, which operates as an SBD, switches to NBD operation will be described with reference to FIG. 7. FIG. 7 shows a timing chart of when the WUSB device 220, operating as an SBD, operates as an NBD in the case where there are no surrounding devices which send out beacons. The WUSB device 220 determines whether there are any external apparatuses that have not undergone synchronization adjustment. Here, for example, the existence of an external apparatus is determined based on whether or not beacon information from an external apparatus has been received or not. If an external apparatus does not exist, the CPU 110 exerts control so that the WUSB device 220 functions as an apparatus that does not send beacons (NBD).

As a simple example, consider the situation in which, before the superframe N (300), the WUSB device 220 has already been performing synchronization adjustment as an SBD with the WUSB host 210. In the superframe N (300), the WUSB device 220 performs channel scanning in order to receive beacons from an external apparatus.

If, as a result, it is determined that there are no devices other than the host 210 which send beacons, the WUSB device 220 performs the process of switching from SBD operation to NBD operation. That is, if, in the superframe N+1 (301), a DRP 570 is reserved for a WUSB channel, the WUSB device 220 sends a reconnect request to the WUSB host 210 in the DRP 570. In this manner, the WUSB host 210 is notified of the change in the operation attribute of the WUSB device 220 from SBD to NBD. The WUSB host 210 recognizes the change in operation attribute of the WUSB device 220 by receiving the reconnect request. Then, as a response, a connect acknowledgement (connect ack.) is sent to the WUSB device 220 in the MMC.

Then, an authentication process is executed between the WUSB host 210 and the WUSB device 220. The authentication process conforms to WUSB specifications. When the WUSB host 210 and the WUSB device 220 are put in an authenticated state through the authentication process, the WUSB device 220 begins to operate as an NBD in the superframe N+2 (302). That is, during the BP period, the WUSB device 220 does not listen to beacons from other devices, nor does it send beacons itself.

As just described, if there are no devices which send beacons externally, the WUSB device 220 switches from SBD operation to NBD operation, in which sending and receiving of beacons is not performed. For this reason, the WUSB device 220 can, on the one hand, operate as an SBD and perform synchronization adjustment when necessary, and, further, not send or receive beacons when unnecessary, thus leading to low power consumption.

(Switching from NBD Operation to SBD Operation)

Figure 8:
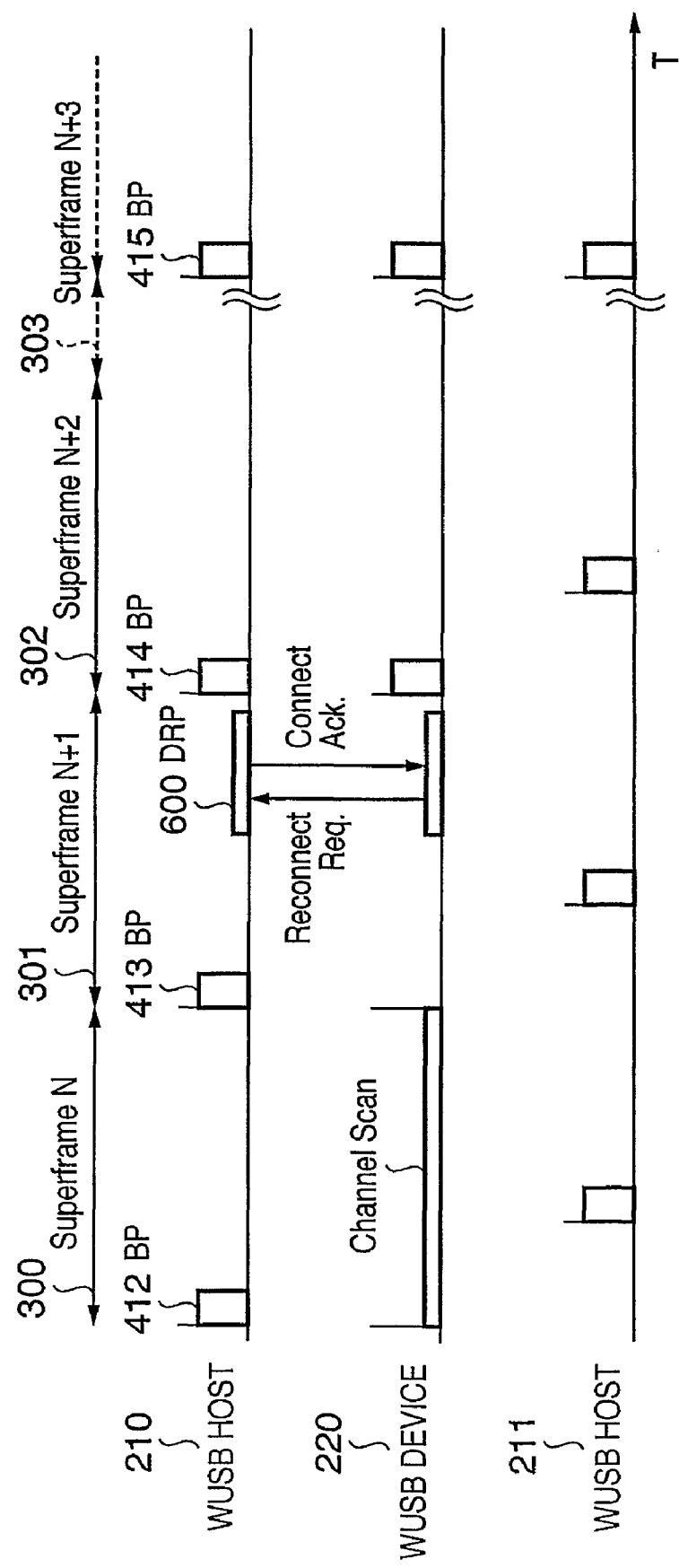
FIG. 8 is a timing chart of when there is a switching of operation from NBD to SBD.

Next, FIG. 8 will be referenced to describe the process of switching to operation as an SBD in the case in which it is newly possible for the WUSB host 211 to communicate with the WUSB device 220, when the WUSB device 220 is operating as an NBD. FIG. 8 is a timing chart of operating as an SBD in the case where there is a device (the WUSB host 211 in FIG. 8) which sends beacons to the surroundings when the WUSB device 220 is operating as an NBD. Here, the WUSB device 220 determines whether or not there are any external apparatuses that have not yet undergone synchronization adjustment. If such external apparatuses exist, the CPU 110 exerts control so that the WUSB device 220 functions as an apparatus that sends beacon information to adjust the synchronization timing of communication (SBD).

In superframe N (300), the WUSB device 220 performs channel scanning. However, in the example of FIG. 8, the WUSB device 220 has established synchronization adjustment with the WUSB host 210.

After determining as a result of channel scanning that there exist devices which send beacons (the WUSB host 211 in FIG. 8), the WUSB device 220 performs the process of switching from NBD operation to SBD operation. That is, in the superframe N+1 (301), if a DRP 600 has been reserved for the WUSB channel, the WUSB device 220 sends a reconnect request to the WUSB host 210. Through this, the WUSB host 210 is notified of the change of the operation attribute from NBD to SBD. The WUSB host 210 determines that a change in operation attribute of the WUSB host has occurred by receiving a reconnect request, and, as a response, sends the WUSB device 220 a connect acknowledgement within the MMC.

Figure 6:
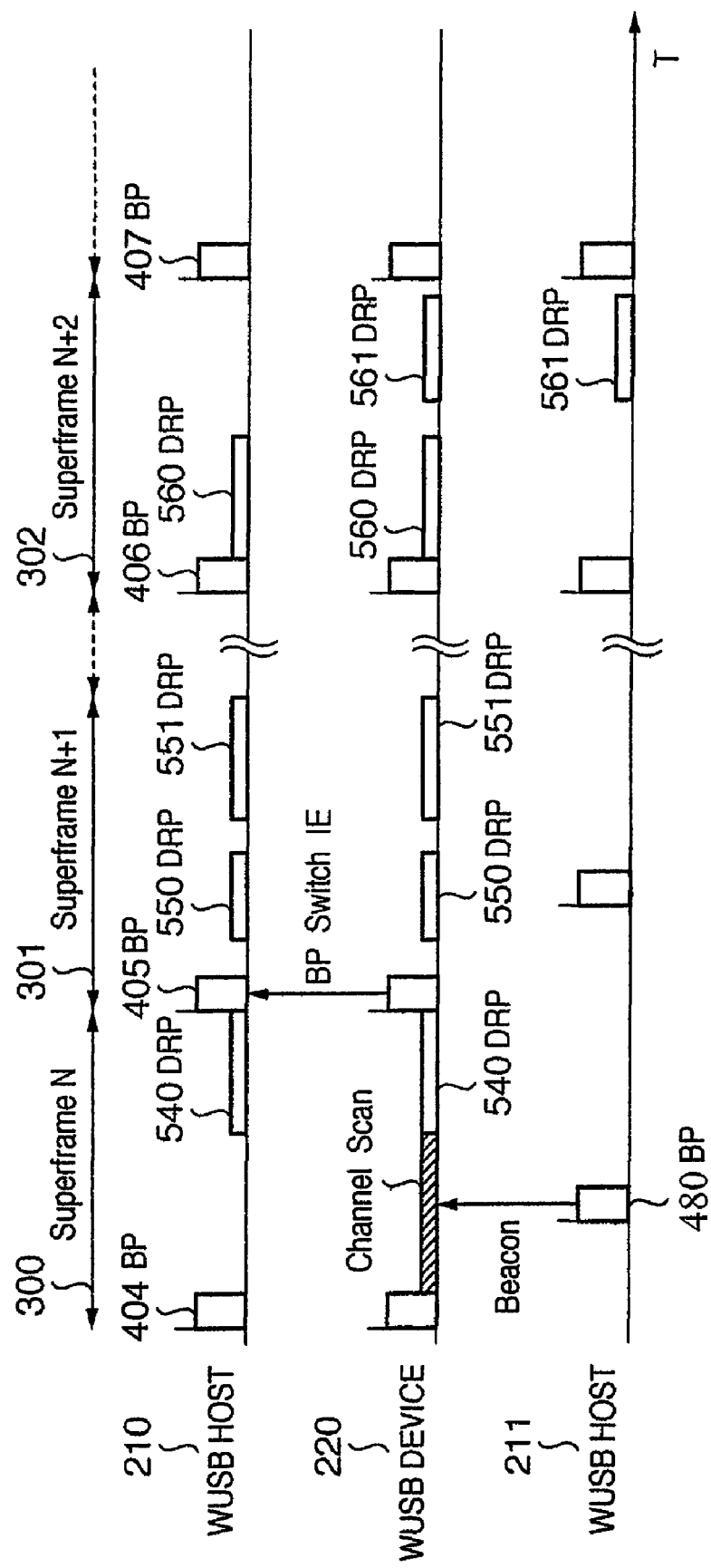
FIG. 6 is a timing chart of when superframe synchronization adjustment is performed.

An authentication process is executed between the WUSB host 210 and the WUSB device 220. The authentication process conforms to WUSB specifications. When the WUSB host 210 and the WUSB device 220 are put in an authenticated state through the authentication process, the WUSB device 220 begins to operate as an SBD in the superframe N+2 (302). That is, during the BP period, the device 220 sends beacons to itself, and also receives beacons from other devices and analyzes the IE. Then, as in the method described with reference to FIG. 6, the process is executed so that the WUSB host 210 and the WUSB device 220 are operated in synchrony with the timing of the WUSB host 211. This superframe synchronization adjustment method is the same as the method described with reference to FIG. 6.

In this manner, if there are no devices which send beacons externally, the WUSB device 220 operates as an NBD, but if devices which send beacons are detected (beacons are received), there is a switch to SBD operation. Consequently, when unnecessary, the WUSB device 220 can lower power consumption by not performing operations related to sending and receiving beacons. On the other hand, when necessary, the WUSB device 220 can operate as an SBD and perform synchronization control.

Moreover, if synchronization control has been established with the WUSB hosts 210 and 211, the WUSB device 220 again switches to NBD operation as described for the process described with reference to FIG. 7. That is, if synchronization adjustment has been established with an external apparatus, the CPU 110 switches to function as an apparatus which does not send beacons. Power consumption can be lowered in this way.

(Basic Processing)

Figure 9:
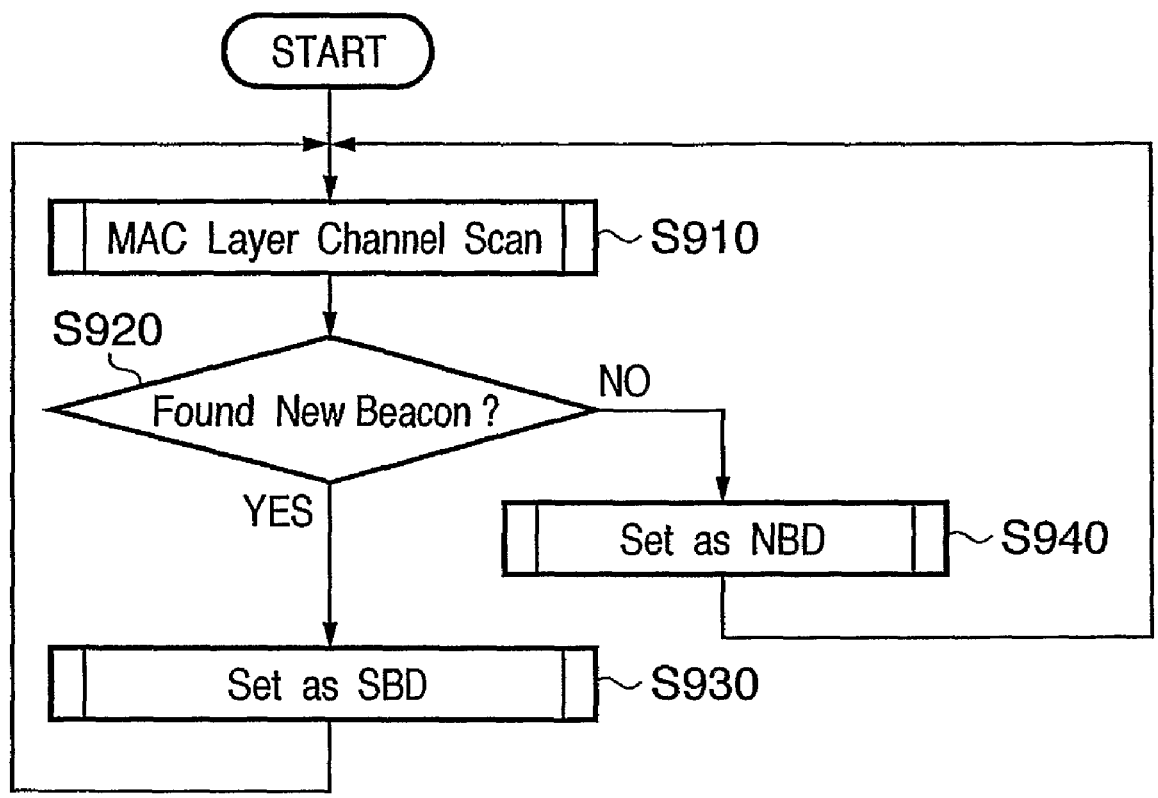
FIG. 9 is a flowchart showing the operation of a WUSB device.

Next, FIG. 9 will be referenced to describe processing by the WUSB device 220, which performs the above process. FIG. 9 is a flowchart showing the operation of the WUSB device 220. The process of FIG. 9 will be executed based on control by the CPU 110.

First, at Step S910, the WUSB device 220 performs channel scanning of the MAC layer at predetermined intervals. This interval can be freely set depending on the application or purpose, but by taking a sufficiently large interval of more than the period of one frame, power consumption can be greatly reduced.

Next, at Step S920, the WUSB device 220 determines whether a beacon has been received at Step S910 from a device other than a device that is a part of the WUSB cluster 200 to which the WUSB device 220 belongs. If such a beacon has been received (YES in Step S920), the process advances to Step S930, and, if not (NO in Step S920), the process advances to Step S940.

At Step S930, transactions with the host are performed in order to operate as an SBD. More specifically, as explained with reference to FIG. 8, if there is a host which has been transmitting in the NBD state, the change in operation attribute is notified, and sending and receiving of beacons commences. Then, control is exerted to synchronize with the beacon of the newly detected device. Next, the process returns to Step S910, and the process is continuously repeated.

At Step S940, transaction with the host is performed in order to operate as an NBD. That is, as described with reference to FIG. 7, if there are hosts that were communicating as an SBD, the change in operation attribute is notified, and the sending and receiving of beacons is stopped while maintaining communication timing.

As explained above, the WUSB device 220 controls operation by the wireless communication I/F 140 related to beacon sending, based on whether the wireless communication I/F 140 has received a beacon from an external apparatus that has not undergone synchronization adjustment. That is, if there are no devices which have not been through synchronization adjustment and which send out beacons externally when the WUSB device 220 is operating as an SBD, switching is performed from SBD operation to NBD operation, in which sending and receiving of beacons is not performed. In addition, if beacon-sending devices which have not undergone synchronization adjustment are detected (a beacon has been received) when operating as an NBD, switching to SBD operation is performed. For this reason, the WUSB device 220 can perform synchronization control by operating as an SBD when necessary, and, further, not perform operations related to sending and receiving beacons when unneeded, thereby lowering power consumption.

Moreover, this type of processing is adapted to the specifications of a WUSB device. Consequently, the WUSB device 220 of the present embodiment can operate jointly with other WUSB apparatuses which do not perform the processing involved in the present embodiment.

Second Embodiment

In the WUSB standard, the WUSB device performs mutual authentication with the host and enters a state in which activities such as transfer are possible. Authentication processing is performed at each pre-determined interval (called TrustTimeout), and, if authentication fails, communication is cut. Through this type of processing, security is ensured, and unnecessary power consumption is prevented.

In the WUSB standard, there is a connected state in which communication with a WUSB host has been connected, and an unconnected state in which communication is cut. In the connected state, there is defined an authenticated state in which mutual authentication with a host has been established, an unauthenticated state in which authentication has not been established, and a reconnecting state in which reconnection has been carried out. A WUSB device performs communication in the authenticated state after establishing mutual authentication by authentication processing with a host. Then, when a TrustTimeout has passed after executing the authentication process, the WUSB host and WUSB device transit from an authenticated state to a re-connecting state, and again executes the authentication process. Here, if re-authentication with the WUSB host 210 fails, the WUSB device transitions into the un-connected state.

In the configuration according to the first embodiment, when the WUSB device 220 operates as an NBD during sleep mode, the WUSB device 220 does not send or receive beacons. For this reason, if sending and receiving of data during the TrustTimeout interval is not performed, there were cases in which there was a transition to the unconnected state. In the configuration according to the present embodiment, even in the case in which an external apparatus is not detected and operation is as an NBD, operation as an SBD is carried out at a pre-determined period, and operation is carried out so that mutual authentication with a host is possible. In this way, it is possible to return to an authenticated state without entering the unconnected state.

The communication apparatus according to the present embodiment is, as with the first embodiment, shown in FIG. 1. The configuration of the communication system according to the present embodiment will be shown in FIG. 2.

Figure 10:
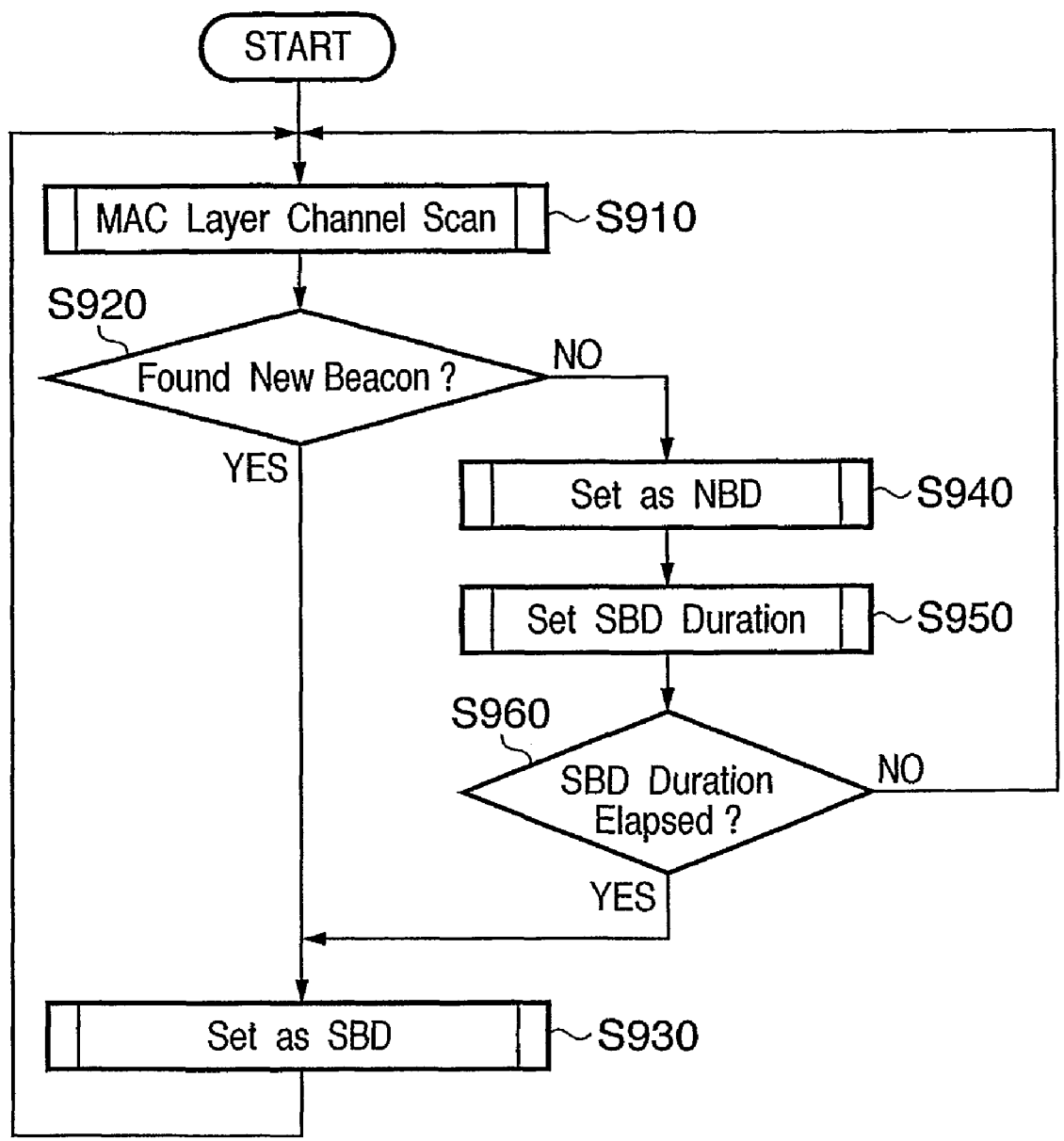
FIG. 10 is a flowchart showing the operation of a WUSB device.

FIG. 10 is a flowchart showing the operation of the WUSB device 220 according to the present embodiment. The process of FIG. 10 is executed based on control by the CPU 110. At each of Steps S910, S920, S930, and S940, processing identical to that shown in the flowchart (FIG. 9) for the first embodiment is carried out. However, according to the present embodiment, when processing in Step S940 is finished, the process advances to Step S950.

At Step S950, the WUSB device 220 sets the period at which to operate as an SBD. This can be performed by, for example, reading in the value of the period stored in, for example, the ROM 130, etc. Alternatively, for example, it is possible to configure so that the cycle is determined based on user input of instructions. This cycle operates optimally when it is, for example, shorter than TrustTimeout.

Then, after setting the operation period, measurement of elapsed time is started using a pre-determined timer which measures the passage of time. However, if Step S950 has been performed in the past and the measurement of elapsed time has already been started, no processing is performed. As long as the timer can measure the elapsed time, the timer can be realized in any configuration, such as one based on a crystal oscillator.

Next, at Step S960, the WUSB device 220 determines if the period set in Step S950 has passed or not. If the period has passed (YES in Step S960), the process advances to Step S930, and the operation is switched to SBD mode. If not (NO in Step S960), processing in Step S910 is again performed.

As stated above, in the configuration according to the present embodiment, Step S950 and Step S960 serve to cause the wireless communication I/F 140 to send a wireless signal for performing, at a pre-determined timing, synchronization adjustment with an external apparatus including a beacon. Through this, even in the case of operating as an NBD, it is possible to transition periodically and expressly to a re-connecting state. Therefore, it is possible to return to an authenticated state without failing re-authentication at each TrustTimeout.

In addition, this type of process is suited to the specifications of a WUSB device. Consequently, the WUSB device 220 according to the present embodiment can operate jointly with other WUSB apparatuses which do not perform processing in the present embodiment.

Third Embodiment

Figure 11:
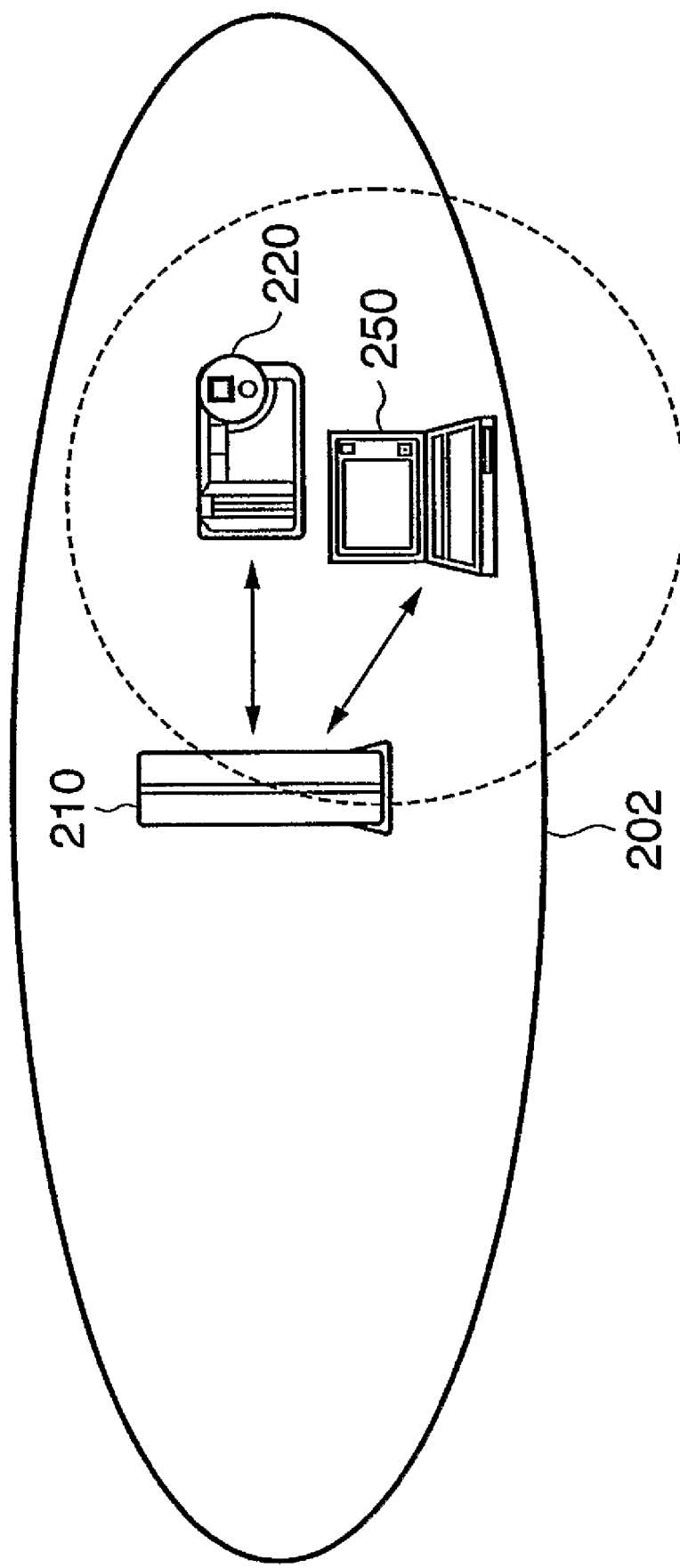
FIG. 11 is a diagram schematically showing the configuration of a communication system.

Described in the first and second embodiments was the configuration of operating as an SBD in the case where superframe synchronization adjustment has not been performed (i.e., if there exist external apparatuses which are in an alien relationship). Described in the present embodiment is the configuration of operating as an NBD in the case where superframe synchronization adjustment has been performed (i.e., if there exist external apparatuses that are in a neighbor relationship). The communication apparatus used in the present embodiment is, as with the first embodiment, shown in FIG. 1. FIG. 11 is a diagram which schematically shows the configuration of the communication system used in the present embodiment.

(Communication System Configuration)

In FIG. 11, reference numeral 210 is a WUSB host which has the function as a host in the WUSB cluster 202. Reference numeral 220 is a WUSB device which functions as a device. Reference numeral 250 is a MAC layer device which uses lower layer MAC of WUSB. In FIG. 11, there are two WUSB devices controlled by the WUSB host. However, the number of WUSB devices is not limited to two, and there may be a different number of WUSB devices. In addition, the WUSB device 220 is assumed to be positioned within the communication range of the MAC layer device 250. Also, the MAC layer device 250 is assumed to be positioned in an area where it is possible to communicate with the host 210. Furthermore, the device 220 is assumed to operate as an SBD, and the synchronization adjustment between the host 210 and the device 220 is assumed to be established.

Figure 12:
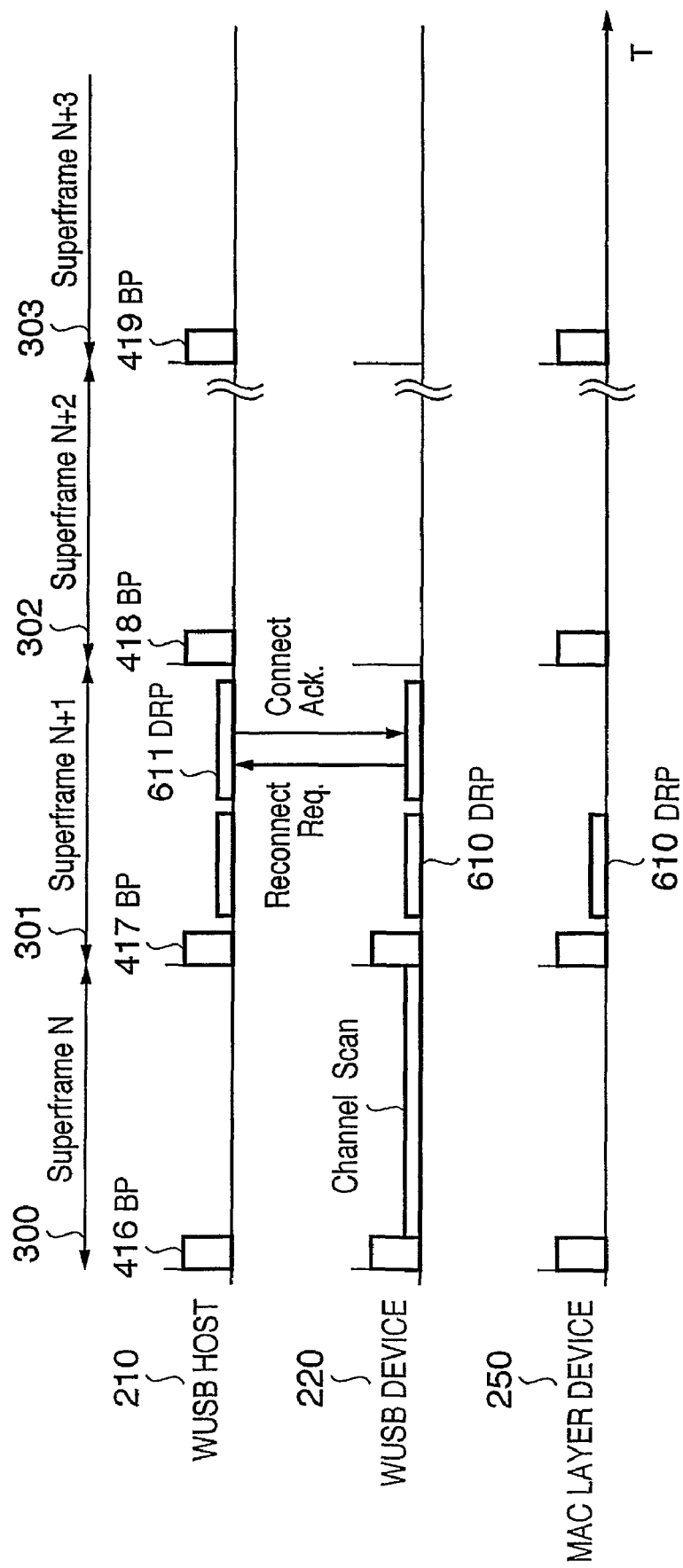
FIG. 12 is a timing chart of when there is a switching of operation from SBD to NBD.

FIG. 12 is a timing chart showing switching to NBD operations in the case where there exists the device 250 which sends beacons to the surroundings when the WUSB device 220 of FIG. 11 is operating as an SBD.

In superframe N (300), the WUSB device 220, after performing sending and receiving of beacons during the period of a BP 416, performs channel scanning during the remaining period. At this time, the WUSB device 220 determines whether or not there exist other devices that are performing synchronization adjustment based on beacons received during the BP 416. For example, if beacons from the MAC layer device 250 were received during the BP 416 period, the WUSB device 220 can determine that the MAC layer device 250 is performing superframe synchronization adjustment receiving beacons from the WUSB host 210. If the MAC layer device 250 is performing superframe synchronization adjustment, there is synchronization among the host 210 and the devices 220 and 250, and, consequently, the WUSB device 220 does not need to perform superframe synchronization adjustment of the MAC layer device 250. For this reason, the WUSB device 220 switches from operating as an SBD to operating as an NBD. In this manner, the WUSB device 220 determines whether there exist other communication apparatuses which have not performed frame synchronization adjustment. If such a communication apparatus exists, the WUSB device 220 functions as an apparatus which performs frame synchronization adjustment between this other communication apparatus. If such a communication apparatus does not exist, switching takes place so that the WUSB device 220 functions as an apparatus which does not perform frame synchronization adjustment with the other apparatuses.

In the superframe N+1 (301), if a DRP 611 is reserved for the WUSB channel, the device 220 sends a reconnect request to the host 210, and notifies that the operation attribute has changed from SBD to NBD. The WUSB host 210 recognizes that the operation attribute of the WUSB device has changed due to receiving a reconnect request. As a reply, the WUSB host 210 sends a connect acknowledgement within an MMC.

Next, an authentication process between the WUSB host 210 and the WUSB device 220 is executed. The authentication process is performed so as to be adapted to WUSB specifications. When the WUSB host 210 and the WUSB device 220 enter an authenticated state by authentication processing, the WUSB device 220 begins to operate as an NBD in the superframe N+2 (302). That is, during the BP period, the WUSB device 220 does not listen to beacons from other devices, and does not send any beacons itself. Through this, power consumption can be lowered.

(Basic Processing)

Figure 13:
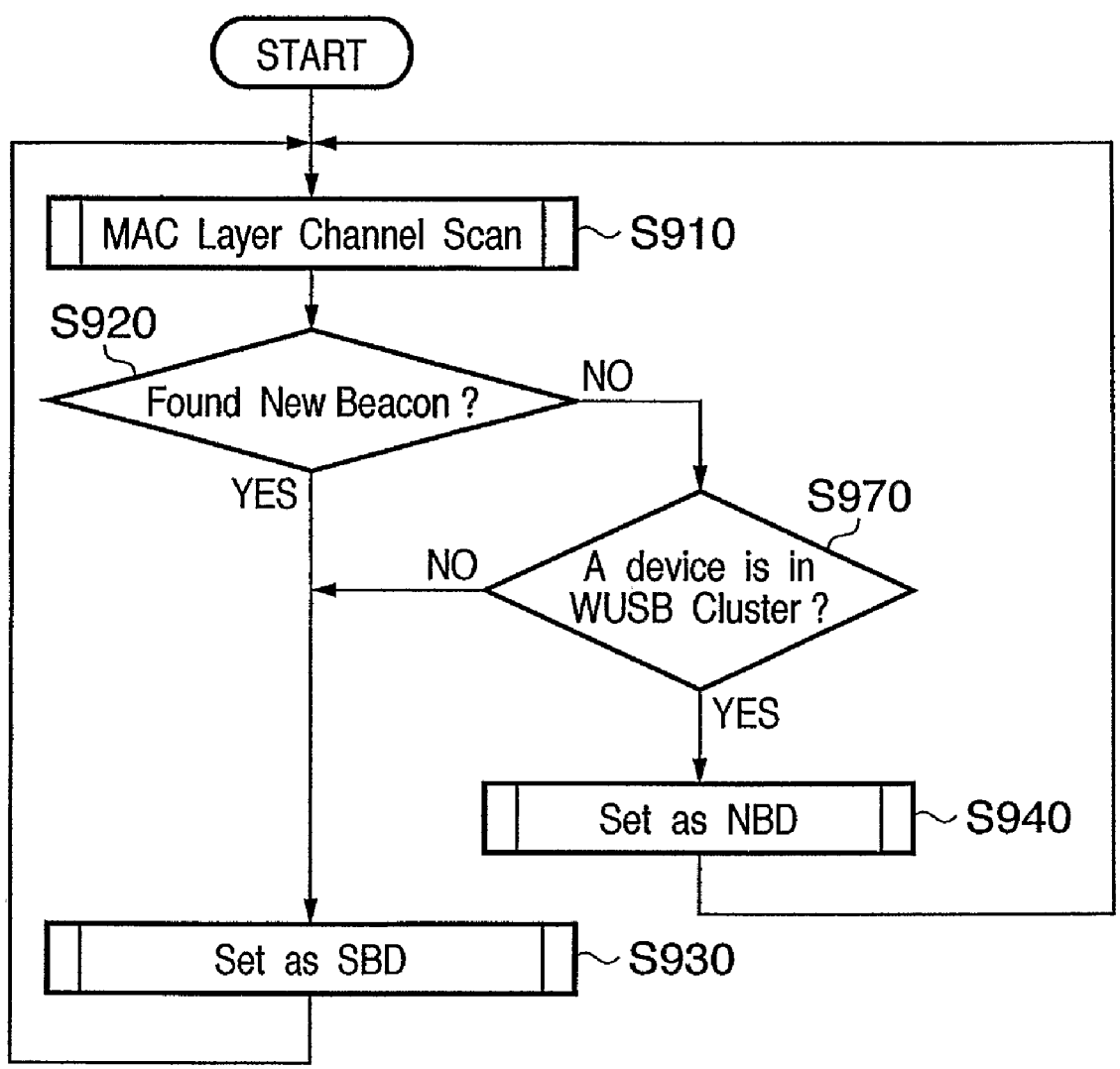
FIG. 13 is a flowchart showing the operation of a WUSB device.

Next, FIG. 13 will be referenced to describe processing by the WUSB device 220, which performs the above operations. FIG. 13 is a flowchart showing the operation of the WUSB device 220. Processing in FIG. 13 is executed based on control by the CPU 110.

In Steps S910, S920, S930, and S940, identical processes as in the flowchart (FIG. 9) for the first embodiment are performed. However, in Step S920, if it is determined that beacons have not been received (NO in Step S920), the process advances to Step S970 in the present embodiment.

In Step S970, it is determined from the received beacon whether the WUSB device 220 is positioned inside the WUSB cluster 202, and whether there are any devices that are within communication range of the WUSB device 220. If such a device exists (YES in Step S970), the process advances to Step S940; if not (NO in Step S970), the process advances to Step S930. After processing in Step S930 and Step S940, the process returns to Step S910 and continues processing.

As described above, the configuration according to the present embodiment has been subject to synchronization adjustment. That is, when an external apparatus in a neighbor relationship exists in communication range and receives a beacon, it operates as an NBD. For this reason, power consumption can be lowered. In the conventional configuration, if there is a device which sends beacons in a cluster, and if the WUSB device and MAC layer device are within communication range, the WUSB device performs synchronization adjustment. In this way, the WUSB device must perform sending and receiving of beacons even though power consumption as an SBD is unnecessary. By contrast, the configuration according to the present embodiment enables low power consumption due to not operating as an SBD when unnecessary and not sending or receiving beacons.

In addition, this type of process is adapted to WUSB device specifications. Consequently, the WUSB device 220 of the present embodiment can operate jointly with another WUSB device which does not perform processing in the present embodiment.

Fourth Embodiment

In the configuration of the third embodiment, when the WUSB device 220 operates as an NBD during sleep mode, the WUSB device 220 does not send or receive beacons. Consequently, if during the TrustTimeout period, sending and receiving of data is not performed, there were cases in which there was a forced transition to the unconnected state. In the configuration according to the present embodiment, even in the case of operating as an NBD and not detecting external apparatuses, the WUSB device 220 operates as an SBD with a predetermined period and as a device which can mutually authenticate with a host. Through this, it has become possible to return to an authenticated state without having to reach an unconnected state.

The communication apparatus according to the present embodiment is, as for the first embodiment, shown in FIG. 1. In addition, the configuration of the communication system according to the present embodiment is shown in FIG. 11. The WUSB device 220 according to the present embodiment operates as an NBD and also as an SBD after a certain fixed period has elapsed.

Figure 14:
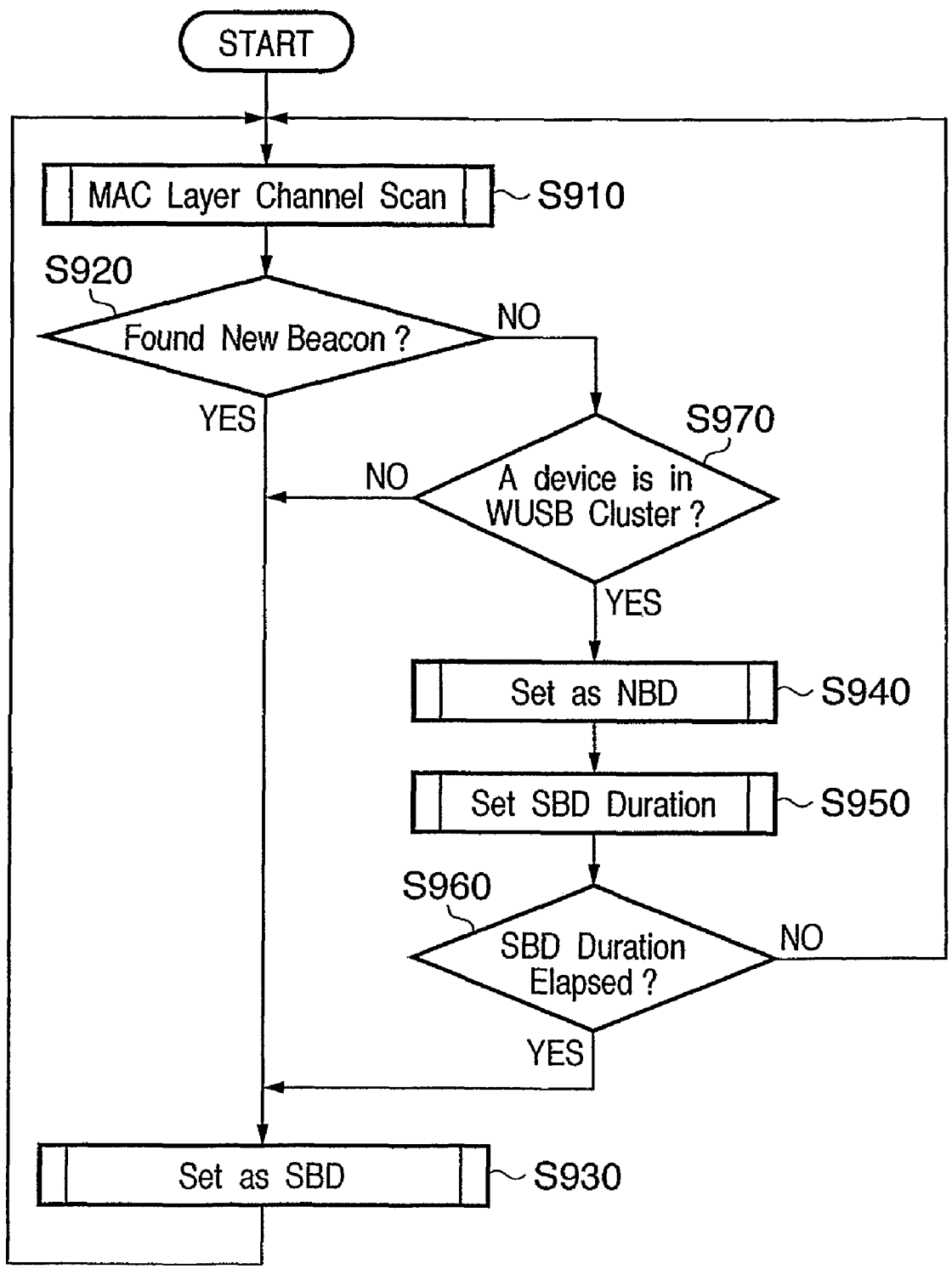
FIG. 14 is a flowchart showing the operation of a WUSB device.

FIG. 14 is a flowchart showing operation as the WUSB device 220. Processing involved in FIG. 14 is executed based on control by the CPU 110. Steps S910, S920, S930, and S940 are performed as performed in the first embodiment in FIG. 9. Steps S950 and S960 are performed as performed in the second embodiment in FIG. 10. Step S970 is performed as performed in the third embodiment in FIG. 12.

In this way, in the configuration according to the present embodiment, Steps S950 and S960 are set up, and, at a predetermined timing, the wireless communication I/F 140 sends a wireless signal for performing synchronization adjustment with an external apparatus including a beacon. This allows to transition periodically and expressly to a reconnecting state even in the case of operating as an NBD. Consequently, it is possible to return to an authenticated state without failing re-authentication at each TrustTimeout.

In addition, this type of process is adapted to WUSB device specifications. For this reason, the WUSB device 220 according to the present embodiment can operate jointly with another WUSB device which does not perform processing according to the present embodiment.

Other Embodiments

Exemplary embodiments of the present invention have been described in detail above. However, the present invention may, for example, be implemented as a system, device, method, program, storage medium, etc. Specifically, the present invention may be applied to a system composed of a plurality of devices, or may be applied to an apparatus composed of one device.

Moreover, the present invention includes the case of implementing by supplying, directly or from a distance to a system or apparatus, programs realizing the functions of the above embodiment, and reading out and executing the program code supplied by a computer of that system or apparatus.

Therefore, in order to implement the function process of the present invention with a computer, the program code itself to be installed in the computer is considered to be within the technical scope of the present invention. That is, the present invention includes the computer programs themselves used to implement the function process of the present invention.

In that case, it is acceptable to use programs executed by an object code or interpreter, or script data provided to an OS, as long as what is used is able to function as a program.

As a storage medium for supplying programs, the following examples are given: floppy (registered trademark) disk, hard disk, optical disk, optical magnetic disk, MO, CD-ROM, CD-R, CD-RW, magnetic tape, non-volatile memory card, ROM, DVD (DVD-ROM, DVD-R), etc.

In addition, the program can be provided by connecting to an Internet homepage using a browser of a client apparatus, and downloading from the homepage a computer program related to the present invention, or a compressed file including an automatic installation function, into a storage medium such as an HD. Also, it is possible to implement the present invention by dividing the program code which constitutes the program according to the present invention into a plurality of files, and downloading each file from different homepages. That is, the present invention also includes a WWW server which makes a plurality of users download program files for implementing the function processes of the present invention by a computer.

Also, the following supply format can be used. First, the program related to the present invention is encoded and stored in a storage medium such as a CD-ROM, and distributed to users. Then, users who have passed a pre-determined set of conditions are directed to download, through a homepage on the Internet, key information for decoding the program. This key information is then used to execute the encoded program, and to have the computer install it. This type of supply format is also possible.

Moreover, by the computer executing the program that has been read out, the functions of the above embodiments are not only realized, but the following embodiment can also be anticipated: the OS operating on a computer performs part or all of the actual processes according to instructions from that program, and through this process, the function of the above embodiment can be implemented.

Moreover, after the program read out from the storage medium has been written into memory equipped to a function expansion unit connected to a computer or a function expansion board connected to a computer, it is possible to implement the functions of the above embodiment based on instructions from that program. That is, the function expansion board or the CPU equipped to the function expansion unit carries out part or all of the actual processes, thereby implementing the functions in the above embodiments.

According to the present invention, it is possible to provide the technology to perform communication in which synchronization adjustment can be achieved with low power consumption by carrying out synchronization adjustment with an external apparatus only when necessary.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-126927, filed Apr. 28, 2006, which is hereby incorporated by reference herein in its entirety.

The invention claimed is:

1. A communication apparatus comprising:
   a determination unit to determine whether there exists an external apparatus that has not undergone synchronization adjustment; and
   a control unit to exert control, if the external apparatus exists, so that the communication apparatus functions as an apparatus which sends beacon information to adjust the synchronization timing of communication, and so that, if the external apparatus does not exist, the communication apparatus functions as an apparatus which does not send beacon information to adjust the synchronization timing of communication.

2. The communication apparatus according to claim 1, wherein
   the determination unit determines whether the external apparatus exists based on whether or not beacon information from the external apparatus has been received.

3. The communication apparatus according to claim 1, further comprising:
   an adjustment unit to perform synchronization adjustment with the external apparatus if the communication apparatus functions as an apparatus which sends beacon information for adjusting the synchronization timing of communication.

4. The communication apparatus according to claim 1, wherein
   the control unit switches to function as an apparatus which does not send the beacon information if synchronization adjustment has been established with the external apparatus.

5. The communication apparatus according to claim 1, wherein
   if the beacon information from the external apparatus has not been received, or if the beacon information from the external apparatus, which has been through synchronization adjustment, has been received, the control unit exerts control so that the communication apparatus functions as an apparatus which does not send the beacon information.

6. A communication apparatus comprising:
   a determination unit which determines the existence of another communication apparatus which has not undergone frame synchronization adjustment;
   a switching unit which switches the communication apparatus to function as an apparatus which performs frame synchronization adjustment with the other communication apparatus if the other communication apparatus exists, and switches the communication apparatus to function as an apparatus which does not perform frame synchronization adjustment with the other communication apparatus if the other communication apparatus does not exist.

7. A control method for a communication apparatus, comprising:
   a determination step of determining whether there exists an external apparatus that has not undergone synchronization adjustment; and
   a control step of, if the external apparatus exists, making the communication apparatus function as an apparatus which sends beacon information for adjusting the synchronization timing of communication, and, if the external apparatus does not exist, making the communication apparatus function as an apparatus which does not send the beacon information.

8. A control method for a communication apparatus, comprising:
   a determination step of determining the existence of another communication apparatus which has not undergone frame synchronization adjustment; and
   a switching step of switching the communication apparatus to function as an apparatus which performs frame synchronization adjustment with the other communication apparatus if the other communication apparatus exists, and switching the communication apparatus to function as an apparatus which does not perform frame synchronization adjustment with the other communication apparatus if the other communication apparatus does not exist.

9. A non-transitory computer-readable storage medium storing a program for making the computer function as a communication apparatus according to claim 1.

\* \* \* \* \*